United States Patent [19]

Sano et al.

[11] Patent Number: 4,744,653

[45] Date of Patent: May 17, 1988

[54] DISTANCE MEASUREMENT BY LASER LIGHT

[75] Inventors: Reiji Sano; Minoru Kimura; Hidemi Takahashi, all of Kawasaki, Japan

[73] Assignee: Matsushita Electric Industrial Co., Ltd., Kadoma, Japan

[21] Appl. No.: 721,665

[22] Filed: Apr. 10, 1985

[30] Foreign Application Priority Data

Apr. 12, 1984 [JP] Japan .................................. 59-73357
Dec. 10, 1984 [JP] Japan .................................. 59-260254

[51] Int. Cl.$^4$ .............................................. G01C 3/08
[52] U.S. Cl. ...................................... 356/5; 356/448; 356/4.5
[58] Field of Search ..... 219/121 LZ, 121 L, 121 LM; 356/3–6, 28, 28.5, 448

[56] References Cited

U.S. PATENT DOCUMENTS

| | | | |
|---|---|---|---|
| 3,970,389 | 7/1976 | Mendrin et al. | 356/4.5 |
| 4,037,933 | 7/1977 | Yano et al. | 356/5 |
| 4,600,299 | 7/1980 | Abshire | 356/4.5 |

FOREIGN PATENT DOCUMENTS 0164181  3/1985  European Pat. Off. ............. 356/4.5
53-40460 10/1978  Japan .

OTHER PUBLICATIONS

Optical Engineering Journal of the Society of Photo-Optical Instrumentation Engineers, H. J. Caulfield/Editor, Elaine C. Cherry/Managing Editor, Jan./Feb. 1981, vol. 20, No. 1, ISSN 0036-1860, pp. 126–134.
Mode Competition in Lasers with Homogeneous Line Broadening, W. J. Witteman, IEEE Journal of Quantum Electronics, vol. QE-5, No. 2, Feb. 1969, pp. 92–97.

Primary Examiner—M. H. Paschall
Attorney, Agent, or Firm—Cushman, Darby & Cushman

[57] ABSTRACT

Method and apparatus for measuring a distance to an object includes directing first and second laser beams having frequencies $\omega_{11}$ and $\omega_{12}$ toward the object. A first reference signal is derived having a beat frequency $\omega_1 = \omega_{11} - \omega_{12}$. A first reflected light beam reflected from the object is detected and has the beat frequency $\omega_1$ and a first phase difference with respect to the first reference signal. The first phase difference is then extracted from the first reference signal and the first reflected light beam and a first plurality of distance nodes is calculated from the first phase difference. Then, the frequency of the second laser beam is changed to $\omega_{13}$. A second reference signal having a beat frequency of $\omega_2 = \omega_{11} - \omega_{13}$ is then derived. A second reflected light beam reflected from the target is detected and has the beat frequency of $\omega_2$ and a second phase different with respect to the second reference signal. The second phase difference is then extracted from the second reference signal and the second reflected light beam and a second plurality of distance nodes is then calculated from the second phase difference. Finally, the minimum distance node coincident between the first and second pluralities of nodes is selected as the distance to the object.

20 Claims, 4 Drawing Sheets

DISTANCE MEASUREMENT BY LASER LIGHT

BACKGROUND OF THE INVENTION

1. Field of the Invention

The present invention relates generally to a method for measurement of distance by laser light. The present invention particularly concerns distance measurement by laser light utilizing interference of the laser light.

2. Description of the Prior Art

Trials for accurate measurement of distance to an object by using laser light interference having good directivity has been recently proposed. There are reports of measurements of 100 nm, as an example of measurement of short distance, and $4 \times 10^5$ km as an example of measurement of long distance to surface of the moon.

Principles of distance measurement by laser light are as follows:

(i) Projecting a laser light beam to an object, and forming interference of laser light between reflected lights from (1) a reference reflector disposed at a known position and (2) from the object, to make interference fringe patterns, from which distance is computed.

This method can produce very accurate measurement because accuracy of the measurement is beyond 1/10 of wavelength $\lambda$ of the laser light. However, this method has a shortcoming in that accurate measurement can be made only when the number of interference fringes can be accurately given.

As an improvement of the above-mentioned method, a method shown in FIG. 1 has been proposed wherein a laser light beam is frequency modulated by an acousto-optical modulator to emit a frequency-modulated light beam in a direction making a diffraction angle against a non-diffracted straight path component, and is projected to and reflected from an object. The reflected light is superposed with a reference light which is the frequency modulated light, and then the phase of beat signal obtained by superposing the laser lights is examined. Such an improved conventional method is elucidated more in detail with reference to FIG. 1.

As shown in FIG. 1, a laser light emitted from a laser oscillator 1 and having angular frequency $\omega$ is given to a modulator 4, which is for instance, an acousto-optical modulator. The modulator 4 is driven by an ultrasonic signal having an angular frequency $\omega_0$ oscillated by a local oscillator 2 and amplified by a driver 3. By passing through the modulator 4, the laser light is divided into two components, namely, a modulated component having an angular frequency of $\omega + \omega_0$, and a non-diffracted component having the angular frequency of $\omega$. The modulated light is given to a detector 6 which is disposed close to the laser oscillator 1. On the other hand, non-diffracted component is projected to an object 5 and reflected light from the object 5 is received also by the detector 6. In this system, the laser light reflected by the distance measurement object 5 has a phase difference $\Phi = 2\pi N + \phi$, wherein N is a positive integer, relative to the phase of the non-modulated component part $\cos \omega t$ of the output from the modulator 4. Thus, a beat signal $\cos(\omega_0 t + \phi)$ is issued from the detector 6 and is passed through an IF amplifier 7 to a phase detector 8, which issues signals for the phase difference $\Phi$ in forms of $\sin \phi$ and $\cos \phi$. The output signals $\cos \phi$ and $\sin \phi$ are given to amplifiers 9 and 9', respectively, to issue output signals $\cos \phi$ and $\sin \phi$.

This conventional method gives measured distance L from the laser oscillator 1 to the object 5 in the following equation (1):

$$L = \frac{C}{\omega}\left(\frac{N}{2} + \frac{\phi}{4\pi}\right), \tag{1}$$

wherein, C is light velocity.

The first term in the parenthesis of the equation (1) shows that the measured distance L by this method includes uncertainty due to multiple solutions corresponding to respective ones of the integer N. The second term in the parenthesis of the equation (1) shows the accuracy of this measurement, and in case the measurement is made with an accuracy of $2\pi/100$ radian, by using a laser light of 1 $\mu$m wavelength, a very high accuracy of 0.01 $\mu$m ($=10$ nm) is achievable.

In this method, in order to obtain the absolute value of the measured distance, a determination of the integer N becomes necessary. For instance, there is a disclosure in Optical Engineering, Vol. 20, 1981, P. 129, such that beat signals are produced in a classified order from five lines, i.e., R lines and P lines of a $CO_2$ laser, to finally produce an interference beat wave of a wavelength of 57.4 m. Though having a high accuracy, this method has a shortcoming such that it is usable only for a distance measuring of within 1.5 m.

(ii) Another conventional method does not use the modulation element 4. This other method is such that the time of a round trip of the light from the laser beam oscillator 1 to the object 5 is measured and the distance is computed. In this method, the laser light is usually pulse light. The accuracy is determined by time resolution $\tau$ of the detector 6 and pulse width T of the laser light. In a special example, wherein $\tau$ is $\tau \simeq 20$ ps and $T \simeq 200$ ps, it was possible to achieve a measurement accuracy of 3 cm. The problem of this method is the difficulty of obtaining very short time width T of the pulse. For instance, in order to obtain the pulse width T of pico second order, it is necessary to utilize Q-switching, wherein achievement of high speed repetition is difficult. In the distance measurement of a moving object or in a process of producing an image signal by processing distance measuring signals, the repetition frequency of the pulse must be considerably high, and in such case the pulse width T must be selected fairly long. Since practically usable minimum measured time is 1 $\mu$s or the like, wherein the laser light travels about 300 m, accuracy or minimum measurable distance becomes 150 m.

That is, distance measurement by using the conventional methods is limited to be usable only for the ranges of 1.5 m or shorter or that of 150 m or longer, and it has been impossible to accurately measure the distance between 10 m and 150 m by laser light.

SUMMARY OF THE INVENTION

The purpose of the present invention is to provide an improved distance measurement by laser light for a measuring range of from 10 m to 150 m.

Another object of the present invention is to provide distance measurement apparatus of simple construction and compact size capable of measuring the distance of 10 m–150 m.

The distance measurement by laser light in accordance with the present invention comprises:

providing two different laser beat signal outputs, each signal being a beat signal of two laser lights, and projecting the two beat signals to an object, computing plural distances for each beat signal based on a phase difference between a light reflected from the object and the two beat signal signal, and selecting a minimum one distance among coincident distances from the two sets of computed plural distances to determine the distance to the object.

BRIEF DESCRIPTION OF THE DRAWING

The object and features of the present invention will become more readily apparent from the following detailed description of the preferred embodiments taken in conjunction with the accompanying drawings in which.

DESCRIPTION OF THE PREFERRED EMBODIMENTS

Figure 1:
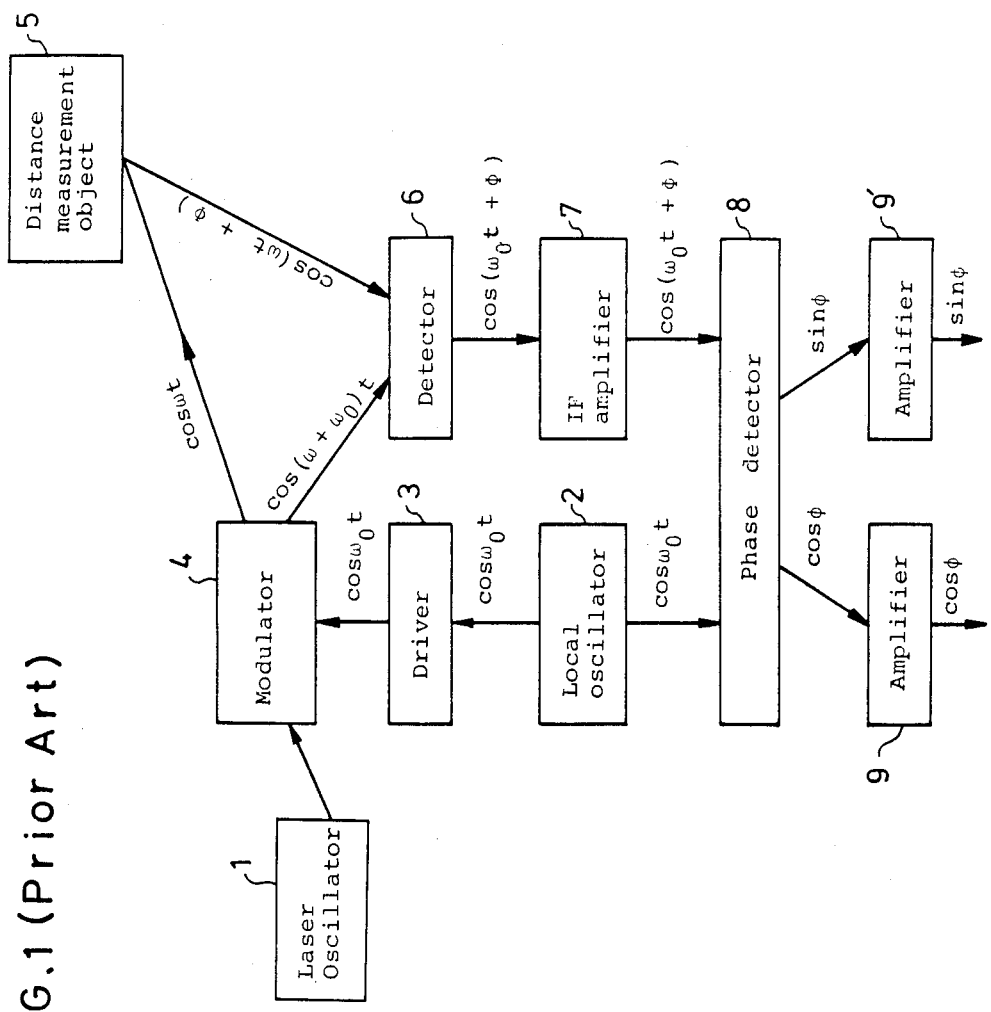
FIG. 1 is block diagram showing one embodiment of the conventional distance measurement by laser light.

As has been described in the equation (1) with respect to the conventional method of FIG. 1, the first term of the equation (1) shows uncertainty of measured distance. For instance, when the measurement is made for an object which is 15 m from the laser oscillator by using laser light having a wavelength of a 10 μm (with frequency of 30 THz), there are nodal points the on light path from the laser oscillator 1 to the object 5 and from the object 5 to the detector 6, in fact there are $3 \times 10^6$ nodal points on the light path. That is, the positive integer N is a very large number.

On the other hand, when the frequency of the 30 THz is replaced by 30 MHz, the number N decreases to only 1, 2 and 3. In other word, the phase difference Φ becomes $2\pi \times 3 + \phi$. That is, even in the conventional example of (i), the longest measuring distance can be extended by decreasing the oscillation frequency into the order of MHz. However, the frequency of 30 MHz is usually the range of ultrasonic waves, and accordingly it is difficult to catch the reflected signal from the object which is disposed at a position of 10 m–100 m from the detector.

By generating two laser light beams having different frequencies, it is possible to obtain a frequency difference of about 30 MHz. In such a case, the two light beams form a beat signal which travels in space with a light velocity and a satisfactory convergence even at the position of 10 m–100 m away from the laser oscillator, unlike the case of the ultrasonic wave of about 30 MHz frequency. Therefore, by using such a beat signal of the two laser light beams, high speed measurement becomes possible. Accordingly, in such case the equation (1) is modified as follows:

$$L = \frac{C}{\omega_1 - \omega_2} \left( \frac{N}{2} + \frac{\phi}{4\pi} \right), \quad (2)$$

wherein, $\omega_1$ and $\omega_2$ are the angular frequencies of oscillation of the two laser oscillators which produce the beat signal.

Provided that, $\omega_1-\omega_2=15$ MHz, the nodal points are produced with pitches of 20 m of wavelength of the beat signal. Accordingly, the distance $L_1$ computed from the equation (2) by using the phase difference measured in the above-mentioned condition, has multiple solutions which have a pitch of 10 m (=20 m÷2).

Next, when $\omega_1-\omega_2$ is changed to $\omega_1-\omega_2=300/11$ MHz ($\approx 27.27$ MHz), the nodal points of the beat signal are diposed with an 11 m pitch, and then the distance computed therefrom has multiple solutions with 5.5 m pitch inbetween.

In the above-mentioned two measurements, at several points the distance $L_1$ measured by the beat frequency of 15 MHz and the distance $L_2$ measured by the beat frequency of 300/11 MHz coincide with each other, and such points appear at pitches given by [minimum multiple of 20 m and 11 m]/2=110 m. Therefore, provided that the oscillation frequency of the laser oscillators are selected in such a manner that a minimum coincidence distance $L_M$, which is the minimum value of the coincidences between two distances computed by using two beat frequencies, is smaller than a finite distance $L_0$ and that the half value of the minimum multiple of the two beat wavelengths is larger than the finite distance $L_0$, all the coincidence distances computed by the two beat frequencies except the minimum one (i.e., the minimum coincidence distance $L_M$) become larger than the finite distance $L_0$. Accordingly, a measured distance which is smaller than the value $L_0$ can be uniquely determined as the minimum coincidence distance $L_M$. When the beat frequencies are the above-mentioned 15 MHz and 300/11 MHz, the half value of the minimum multiple of the beat wavelength become 110 m, and therefore the distance to the object within a range of $L_0 \approx 100$ m can be uniquely determined by selecting these beat frequencies. In such a manner, in general, when it is preliminarily known that the object is disposed at a position which is nearer than a finite distance $L_0$, the true solution is found in the multiple solutions, so that the minimum coincidence distance is determined as the distance to the object.

Figure 2:
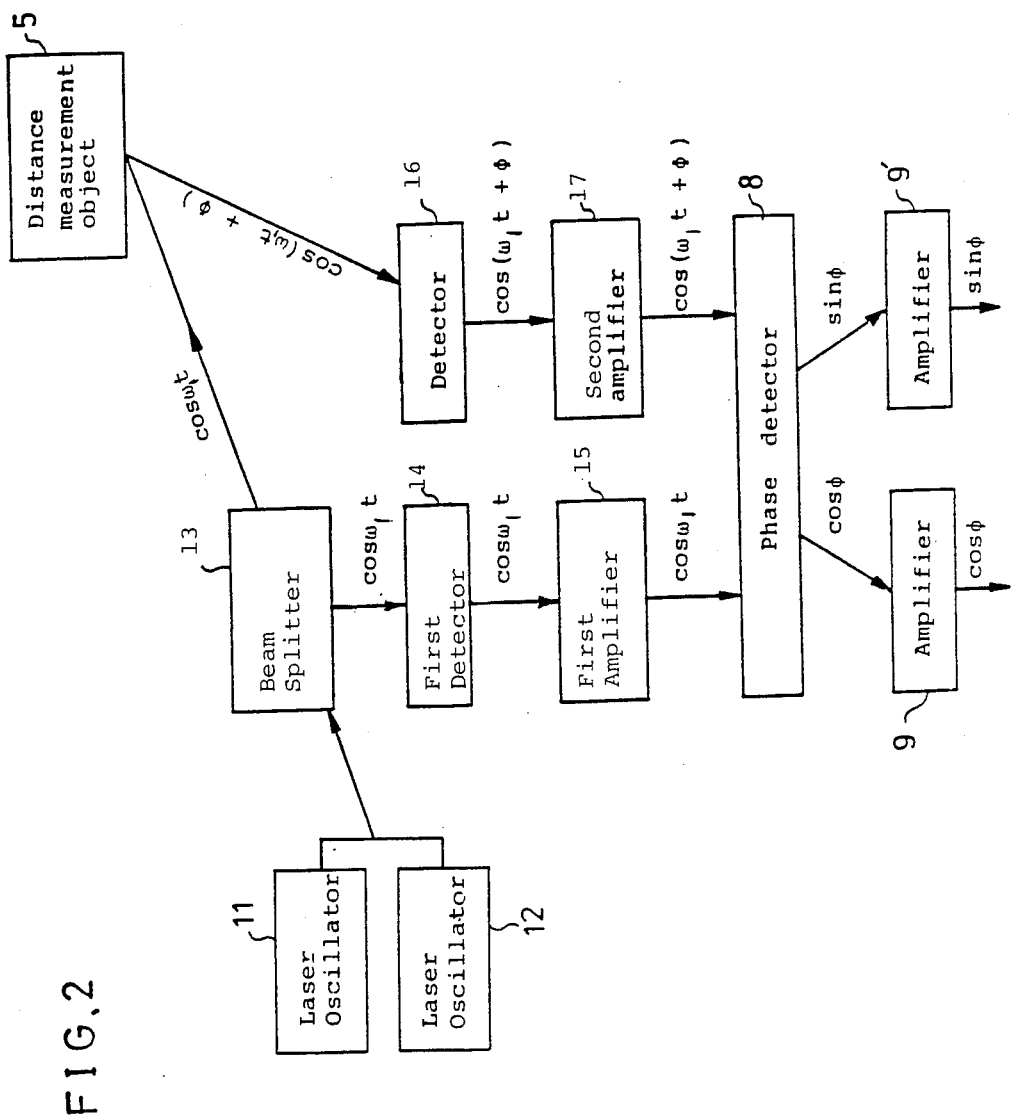
FIG. 2 is block diagram showing one preferred embodiment of a distance measurement by a laser light in accordance with the present invention.

FIG. 2 shows a block diagram for carrying out distance measurement by laser light embodying the present invention. The system of FIG. 2 comprises a first laser oscillator 11 and a second laser oscillator 12 for oscillating single longitudinal mode continuous wave laser lights of angular frequencies $\omega_{11}$ and $\omega_{12}$, respectively. Either of the first laser oscillator 11 or the second laser oscillator 12 are constituted to be changeable of in its oscillation frequency by a controlling means. For instance, the frequency change may be made by changing the geometric length of the resonator of the changeable oscillator, or changing its optical refraction index by changing $CO_2$ gas pressure or the discharge current, to resultantly change the optical resonator length. Oscillated laser outputs of the first laser oscillator 11 and the second laser oscillator 12 are accurately superposed to make a first beat signal having angular frequency $\omega_1 = \omega_{11} - \omega_{12}$, and the superposed laser lights are led to a beam splitter 13.

Beam splitter 13 directs one portion of the superposed laser lights toward object 5; and the other portion toward first detector 14. Detector 14 then issues a first beat signal as a reference signal to first amplifier 15. The first beat signal has an angular frequency of $\omega_1 = \omega_{11} - \omega_{12}$. The portion of the superposed laser light directed to object 5 is reflected therefrom and received by second detector 16. Detector 16 then provides a detection signal having an angular frequency $(\omega_1 t + \phi)$ to second amplifier 17. Then the output signals of first amplifier 15 and second amplifier 17 are provided to a phase detector 8. In this system, the superposed laser lights reflected by the distance measurement object 5 have a phase difference $\Phi = 2\pi N + \phi$, wherein N is a positive integer, with respect to the phase of the first beat signal $\cos \omega_1 t$ of the output from the detector 14. A phase detector 8 then issues signals for the phase difference $\Phi$ in the forms of $\sin \phi$ and $\cos \phi$. The output signals $\cos \phi$ and $\sin \phi$ are given to the operational amplifiers 9 and 9', respectively, to issue output signals $\cos \phi$ and $\sin \phi$. Then, the distance $L_1$ to the object is computed in accordance with equation (2). Thereafter, the frequency of either one of the laser oscillator, for instance, the second laser oscillator 12, is changed to another frequency $\omega_{13}$, in place of the frequency $\omega_{12}$. Thus, second superposed laser lights beat having a beat frequency of $\omega_2 = \omega_{11} - \omega_{13}$ is provided to the beam splitter 13. And in a similar way as described above, a distance $L_2$ to the object is computed in accordance with equation (2). Multiple solutions of the distances $L_1$ and $L_2$ coincide at plural distances, which appear with pitch 1 which is one half of minimum multiple of $C/\omega_1$ and $C/\omega_2$, wherein C is the velocity of light. In this state, when the minimum coincidence distance $L_M$ between the multiple solutions of distance $L_1$ and $L_2$ has a value which satisfies the condition $L_M < L_0$, where $L_0$ is a finite distance such that $L_0 < 1$, the measurement of the distance to the object becomes possible, and the value $L_M$ is the true distance. In this case, when $\omega_1$ and $\omega_2$ are selected as frequencies in the of ultrasonic range the number of nodal points of the light beam are several, and therefore a distance measurement in the range of 10-100 m can be made at high speed and with high accuracy. In the experiments, beat frequencies of 1 MHz to several MHz give good results in view of amplifiers 15, 17 and the phase detector 8.

It is of course realizeable that, instead of making the oscillation frequency of the first laser oscillator 11 variable, the oscillation frequency of the second laser 12 is made variable.

Figure 2A:
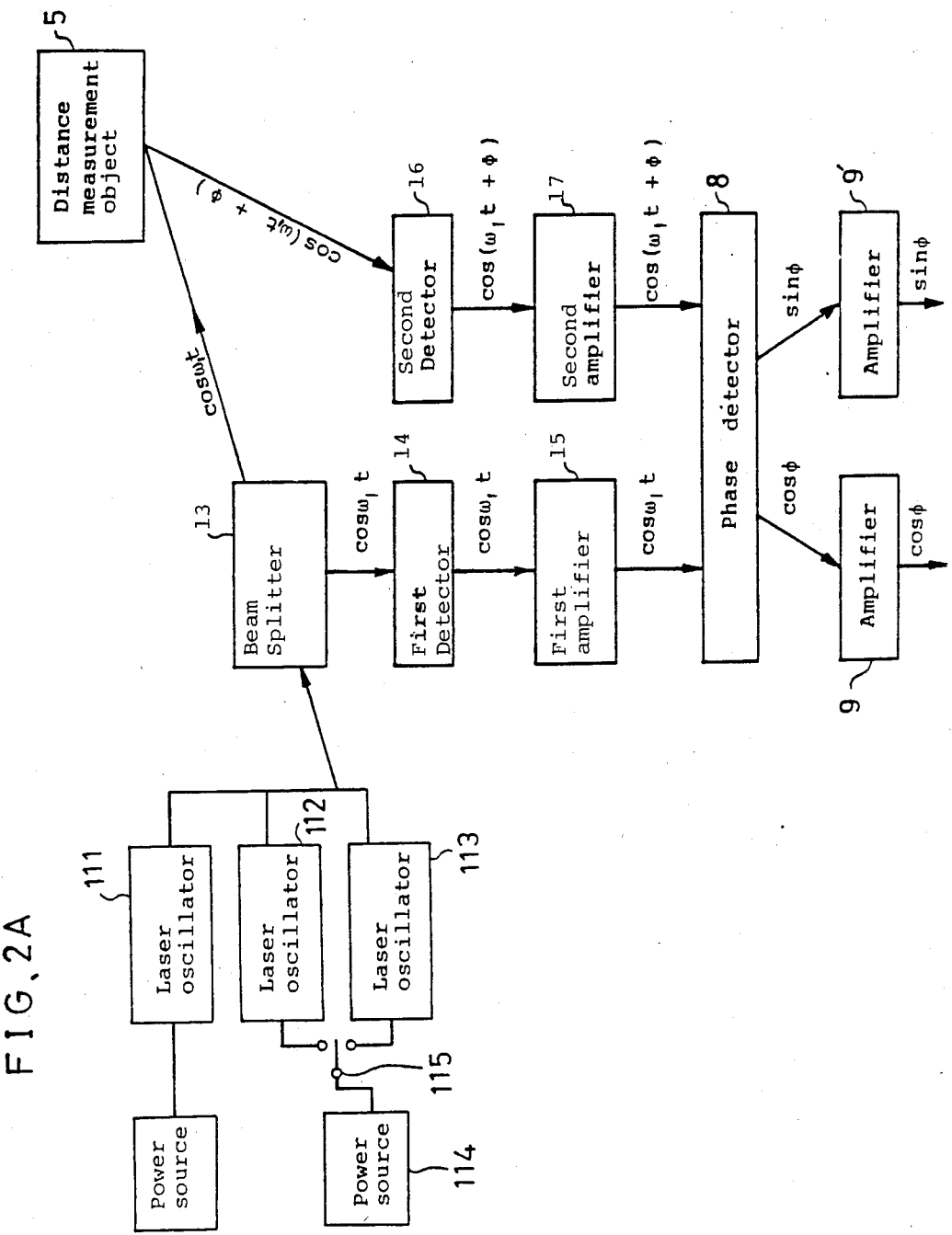
FIG. 2A is block diagram showing another preferred embodiment of a distance measurement by a laser light in accordance with the present invention.

Furthermore, it is still realizable that, the present invention could comprise three laser oscillators 111, 112 and 113 each having own fixed oscillation angular frequency $\omega_{111}$, $\omega_{112}$ and $\omega_{113}$ as shown in FIG. 2A, and thereby produce two kinds of beat frequencies, for instance $[\omega_{111} - \omega_{112}]$ and $[\omega_{111} - \omega_{113}]$ alternately, by alternate connections of the laser oscillators 112 and 113 to a power source 114 through a change over switch 115.

Figure 3:
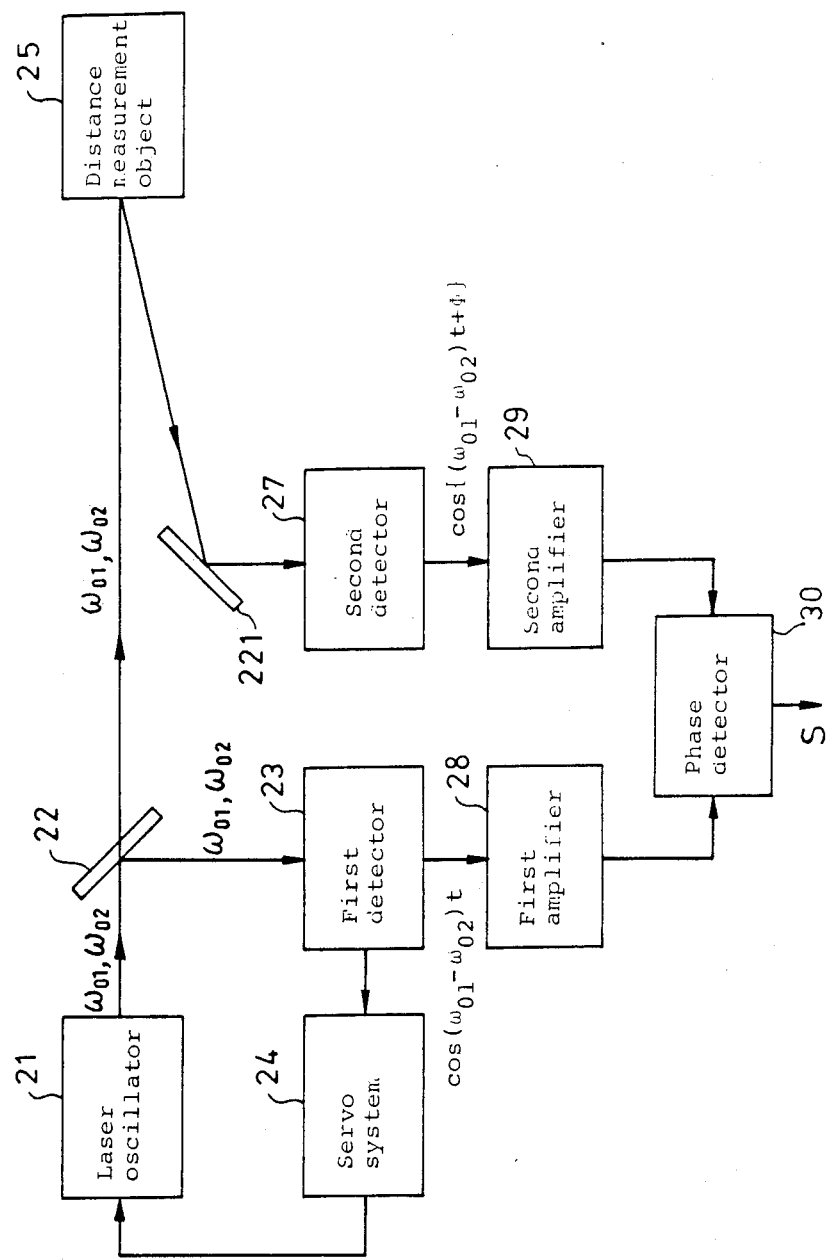
FIG. 3 is block diagram showing another preferred embodiment of a distance measurement by a laser light in accordance with the present invention.

FIG. 3 is a block diagram showing another preferred embodiment of the invention using laser light. In this embodiment, the measurement can be made by using a single laser oscillator which emits two laser lights at the same time. That is a laser oscillator 21 oscillates on two transverse modes and emits two laser lights having respective angular frequencies $\omega_{01}$ and $\omega_{02}$. The two superposes laser lights are led to a first half transparent mirror 22, (or beam splitters) a part of the superposed laser lights is reflected to a detector 23 which thereby issues a first beat signal as a reference signal. The detector 23 is a photoelectric transducer, and one preferred example of the detector 23 is a HgCdTe detector for $CO_2$ laser light, or a PIN photodiode for He-Ne laser light. A first component of the light reflected by the first half transparent mirror 22 is led to a first detector 23, the detection signal therefrom having an angular frequency of $\omega_{01} - \omega_{02}$ is provided to a first amplifier 28. A second component, i.e., the remainder component of the light is projected to a distance measuring object 25 which is 10 m-150 m away from the laser oscillator 21, and reflected light from the object 25 is provided to a second detector 27, which is the same as or similar to the first detector 23 and gives a detection signal having an angular frequency of $\{(\omega_{01} - \omega_{02})t + \Phi\}$ to a second amplifier 29. Then, the output signals of the first amplifier 28 and the second amplifier 29 are given to a phase detector 30, which issues a phase signal S representing the phase difference between two signals inputted thereto.

The detected phase difference $\Phi$ represented by the phase signal S is given by:

$$\Phi = 2\pi \cdot 2L \left( \frac{1}{\lambda_1} - \frac{1}{\lambda_2} \right) \qquad (3)$$
$$= \frac{2L}{C} (\omega_{01} - \omega_{02})$$

wherein $\lambda_1$ and $\lambda_2$, $\omega_1$ and $\omega_2$ are the wavelengths and angular frequencies of the two laser lights from the laser oscillator 21, and C is the velocity of light. That is, the measured distance L is computed by equation (3). The beat frequency $(\omega_{01} - \omega_{02})$ of the two laser lights is selected depending on the range of the distance measured; for instance, when $\omega_{01} - \omega_{02}$ is 10 MHz distances up to 15 m can be measured specifically, since the phase difference $\Phi$ turns one cycle for every pitch of 15 m of the distance.

In this embodiment, a known servo system 24 is used to adjust the resonator length of the laser oscillator 21, namely the distance between a total mirror and a half mirror constituting the laser resonator (not shown), so as to adjust the beat frequency $(\omega_{01} - \omega_{02})$ of the laser oscillator 21. For instance, in a known general resonator, a difference in frequency $\omega_{01} - \omega_{02}$ between a $TEM_{00}$ mode wave and a $TEM_{01}$ mode wave is given by:

$$\omega_{01} - \omega_{02} = \frac{C}{l} \cdot \cos^{-1} \sqrt{\left(1 - \frac{l}{R_1}\right)\left(1 - \frac{l}{R_2}\right)}, \qquad (4)$$

wherein $R_1$ and $R_2$ are curvatures of the total mirror and the half mirror of the resonator.

As is obvious from the above-mentioned description, since the distance measurement of the embodiment of FIG. 3 uses two laser lights with a small frequency difference $\omega_{01} - \omega_{02}$ inbetween emitted from a single transverse mode laser oscillator 21, tracking of the two laser lights does not require any fine adjustment, and a stable beat signal is obtainable, thus assuring accurate distance measurement in a range of about 10 m-150 m.

What is claimed is:

1. A method of measuring a distance to an object, comprising the steps of:
   directing first and second laser beams having frequencies $\omega_{11}$ and $\omega_{12}$ toward said object;
   providing a first reference signal having a beat frequency $\omega_1 = \omega_{11} - \omega_{12}$;

detecting a first reflected light beam reflected from said object, said first reflected light beam having said beat frequency $\omega_1$ and a first phase difference with respect to said first reference signal;

extracting said first phase difference from said first reference signal and said detected first reflected light beam;

calculating a first plurality of distance nodes from said first phase difference;

changing a frequency of said second laser beam to $\omega_{13}$;

providing a second reference signal having a beat frequency $\omega_2 = \omega_{11} - \omega_{13}$;

detecting a second reflected light beam reflected from said object, said second reflected light beam having said beat frequency $\omega_2$ and a second phase difference with respect to said second reference signal;

extracting said second phase difference from said second reference signal and said detected second reflected light beam;

calculating a second plurality of distance nodes from said second phase difference; and selecting a minimum distance node coincident between said first and second pluralities of nodes.

2. A method according to claim 1, wherein said first and second beat frequencies are in the ultrasonic frequency range.

3. A method according to claim 1, wherein said directing step includes the step of generating first and second laser beams with first and second laser generators.

4. A method according to claim 1, wherein said step of directing includes the step of generating said first and second laser beams with first, second, and third laser generators.

5. A method according to claim 1, wherein said step of directing includes the step of generating said first and second laser beams by generating two transverse modes of one laser oscillator.

6. A method according to claim 5, wherein an oscillation frequency of said one laser oscillator is controlled by a beat signal of two laser lights of different frequencies oscillated on said two transverse modes.

7. A method according to claim 1, wherein said directing step includes the steps of:

generating said first and second laser beams;

superposing said first and second laser beams to form a superposed laser beam;

directing a first portion of said superposed laser beam toward said object, and a second portion of said superposed laser beam toward a first detector.

8. A method according to claim 7, wherein said providing steps each include the step of receiving said portion of said superposed laser beam and generating said first and second reference signals therefrom, respectively.

9. Apparatus for measuring a distance to an object, comprising:

means for directing first and second laser beams having frequencies $\omega_{11}$ and $\omega_{12}$ towards said object;

means for providing a first reference signal having a beat frequency $\omega_1 = \omega_{11} - \omega_{12}$;

means for detecting a first reflected light beam reflected from said object, said first reflected light beam having said beat frequency $\omega_1$ and a first phase difference with respect to said first reference signal;

means for extracting said first phase difference from said first reference signal and said detected first reflected beam;

processing means for (a) calculating a first plurality of distance nodes from said first phase difference;

said means for directing including means for changing a frequency of said second laser beam to $\omega_{13}$;

said means for providing also providing a second reference signal having a beat frequency $\omega_2 = \omega_{11} - \omega_{13}$;

said means for detecting also detecting a second reflected light beam reflected from said object, said second reflected light beam having said beat frequency $\omega_2$ and a second phase difference with respect to said second reference signal;

said means for extracting also extracting said second phase difference from said second reference signal and said detected second reflected light beam;

said processing means also (b) calculating a second plurality of distance nodes from said second phase difference; and (c) selecting a minimum distance node coincident between said first and second pluralities of nodes.

10. Apparatus according to claim 9, wherein said means for directing includes first and second laser oscillators for generating said first and second laser beams, respectively.

11. Apparatus according to claim 9, wherein said means for directing includes first, second, and third laser oscillators for generating said first and second laser beams at said frequencies $\omega_{11}$, $\omega_{12}$, and $\omega_{13}$, respectively.

12. Apparatus according to claim 9, wherein said means for directing includes a single laser oscillator generating said first and second laser beams on two transverse modes of said single laser oscillator.

13. Apparatus according to claim 9, wherein said means for directing includes:

means for generating said first and second laser beams;

means for superposing said first and second laser beams to form a superposed laser beam; and means for directing a first portion of said superposed laser beam toward said object, and a second portion of said superposed laser beam toward said means for providing.

14. Apparatus according to claim 13, wherein said means for providing includes first detector means for providing said first reference signal from said second portion of said superposed laser beam.

15. Apparatus according to claim 9, wherein said means for directing includes means for generating said first laser beam having frequency $\omega_{11}$ and said second laser beam having frequencies $\omega_{12}$ and $\omega_{13}$, and means for ensuring that said beat frequencies $\omega_1$ and $\omega_2$ are in the ultrasonic range.

16. Apparatus according to claim 9, wherein said means for providing includes a first detector, and wherein said means for detecting includes a second detector, and wherein said means for extracting includes a phase detector.

17. A method of measuring a distance to an object, comprising the steps of:

generating first and second laser beams having frequencies $\omega_{11}$ and $\omega_{12}$, respectively;

superposing said first and second laser beams to provide a first superposed laser beam having a first beat frequency $\omega_1 = \omega_{11} - \omega_{12}$;

directing a first portion of said first superposed laser beam toward said object, and a second portion of said first superposed laser beam toward first detector means;

detecting said second portion of said first superposed laser beam with said first detector means and providing a first beat signal corresponding to said second portion of said first superposed laser beam;

detecting a first reflected laser beam reflected from said object and having a first phase difference with respect to said first superposed laser beam, and providing a second beat signal having said first beat frequency $\omega_1$ and said first phase difference;

extracting said first phase difference from said first and second beat signals;

calculating a first plurality of distance nodes to said object from said extracted first phase difference;

changing the frequency of said second laser beam to $\omega_{13}$;

superposing said first and second laser beams to provide a second superposed laser beam having a second beat frequency $\omega_2 = \omega_{11} - \omega_{13}$;

directing a first portion of said second superposed laser beam toward said object, and a second portion of said second superposed laser beam toward said first detector means;

detecting said second portion of said second superposed laser beam with said first detector means, and providing a third beat signal corresponding to said second portion of said second superposed laser beam;

detecting a second reflected laser beam reflected from said object and having a second phase difference with respect to said second superposed laser beam, and providing a fourth beat signal having said second beat frequency $\omega_2$ and said second phase difference;

extracting said second phase difference from said third and fourth beat signals;

calculating a second plurality of distance nodes to said object from said extracted second phase difference; and selecting a minimum distance node which is coincident between said first and second pluralities of nodes.

18. Apparatus for measuring a distance to an object, comprising:

means for generating first and second laser beams having frequencies $\omega_{11}$ and $\omega_{12}$, respectively;

means for superposing said first and second laser beams to provide a first superposed laser beam having a first beat frequency $\omega_1 = \omega_{11} - \omega_{12}$;

means for directing a first portion of said first superposed laser beam toward said object, and a second portion of said first superposed laser beam toward first detector means;

said first detector means for detecting said second portion of said first superposed laser beam, and for providing a first beat signal corresponding to said second portion of said first superposed laser beam;

second detector means for detecting a first reflected laser beam reflected from said object and having a first phase difference with respect to said first superposed laser beam, and for providing a second beat signal having said first beat frequency $\omega_1$ and said first phase difference;

means for extracting said first phase difference from said first and second beat signals;

processing means for (a) calculating a first plurality of distance nodes to said object from said extracted first phase difference;

said means for generating including means for changing a frequency of said second laser beam to $\omega_{13}$;

said means for superposing superposing said first and second laser beams to provide a second superposed laser beam having a second beat frequency $\omega_2 = \omega_{11} - \omega_{13}$;

said means for directing directing a first portion of said second superposed laser beam toward said object, and a second portion of said second superposed laser beam toward said first detector means;

said first detector means detecting said second portion of said second superposed laser beam, and providing a third beat signal corresponding to said second portion of said second superposed laser beam;

said second detector means detecting a second reflected laser beam reflected from said object and having a second phase difference with respect to said second superposed laser beam, and providing a fourth beat signal having said beat frequency $\omega_2$ and said second phase difference;

said means for extracting extracting said second phase difference from said third and fourth beat signals; and said processing means (b) calculating a second plurality of distance nodes to said object from said extracted second phase difference, and (c) selecting a minimum distance node which is coincident between said first and second pluralities of nodes.

19. Apparatus according to claim 18, wherein said means for generating includes a first laser oscillator for generating said first laser beam with frequency $\omega_{11}$, a second laser oscillator which is variable for generating said second laser beam having frequencies $\omega_{12}$ and $\omega_{13}$.

20. Apparatus according to claim 18, wherein said means for generating includes a single laser oscillator for generating said first and second laser beams on transverse modes of said single laser oscillator.

* * * * *